US012366317B2

United States Patent
Becks et al.

(10) Patent No.: US 12,366,317 B2
(45) Date of Patent: Jul. 22, 2025

(54) FLUID TRANSPORT DEVICE AND METHOD FOR ASSEMBLING AND DISASSEMBLING A FLUID TRANSPORT DEVICE

(71) Applicant: Airbus Operations GmbH, Hamburg (DE)

(72) Inventors: Ralf Becks, Buxtehude (DE); Tran Quang Tue Nguyen, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 54 days.

(21) Appl. No.: 18/235,202

(22) Filed: Aug. 17, 2023

(65) Prior Publication Data

US 2024/0059423 A1 Feb. 22, 2024

(30) Foreign Application Priority Data

Aug. 19, 2022 (EP) ...................................... 22191249

(51) Int. Cl.
*F16L 39/00* (2006.01)
*B64D 37/30* (2006.01)

(52) U.S. Cl.
CPC ............ *F16L 39/005* (2013.01); *B64D 37/30* (2013.01)

(58) Field of Classification Search
CPC .................................................... F16L 39/005
See application file for complete search history.

(56) References Cited

U.S. PATENT DOCUMENTS 5,141,256 A * 8/1992 Ziu ........................ F16L 39/005
5,433,484 A * 7/1995 Ewen ..................... F16L 39/005
7,427,084 B1 * 9/2008 Betz ....................... F16L 39/005
2011/0031745 A1 2/2011 Nakata
2013/0000747 A1 * 1/2013 Buresi .................... F16L 39/005

FOREIGN PATENT DOCUMENTS

| EP | 3957894 A1 | 2/2022 | |
| FR | 2978521 A1 | 2/2013 | |
| GB | 2102524 A | 2/1983 | |
| GB | 2598113 A | 2/2022 | |
| GB | 2607958 A | * 12/2022 | ............ F16L 39/005 |
| WO | 2011007100 A2 | 1/2011 | |

OTHER PUBLICATIONS

European Search Report for Application No. 22191249 dated Jan. 25, 2023.

* cited by examiner

*Primary Examiner* — Zachary T Dragicevich
(74) *Attorney, Agent, or Firm* — KDW Firm PLLC

(57) ABSTRACT

A fluid transport device including a first line connector, second line connector and inner line component that fluidly connects the first line connector to the second line connector via respective first and second coupling ends. In a mounted state, an outer line component of the device is attached to the first line connector and to the second line connector, so the outer line component covers the first and second coupling ends. In a demounted state, the outer line component is detached from the first and second line connector, wherein the outer line component is movable relative to the inner line component to uncover the first coupling end or the second coupling end. A method for assembling and disassembling a fluid transport device is also disclosed.

20 Claims, 6 Drawing Sheets

FLUID TRANSPORT DEVICE AND METHOD FOR ASSEMBLING AND DISASSEMBLING A FLUID TRANSPORT DEVICE

TECHNICAL FIELD

The disclosure herein relates to double-walled fluid transportation systems. In particular, the disclosure herein relates to fluid transport device and method for assembling and disassembling a fluid transport device.

BACKGROUND

Double-walled pipes are usually used on fuel-systems inside a vehicle, for example, inside a fuselage of an aircraft. The design of these double-walled pipes is mostly configured such that a connection of an inner pipe and a separated connection of an outer pipe is provided. In these configurations the outer pipe encloses the inner pipe. Different techniques have been developed to provide access to the connection areas where the inner pipe is connected to a surrounding line system. An access to the connection areas is important to enable the assembly and disassembly of the pipe connections, in particular the sealings provided at the pipe connections.

EP 3 957 894 A1 and GB 2 598 113 A describe a fuel pipe assembly including a connector having a socket and a lug arrangement extending from the socket, a pipe having a first end portion adapted to fit within the socket, and a retainer having first and second parts which together form a collar configured to retain a pipe. The retainer has an open condition in which a pipe is insertable, and a closed condition. The retainer also has a channel arranged, in the closed condition, to capture the lug arrangement.

SUMMARY

It may be seen as an object of the disclosure herein to provide a fluid transport device that allows using improved sealing arrangements.

A system and a method according to the features herein are disclosed. Further embodiments of the disclosure herein are evident from the following description.

According to an aspect of the disclosure herein, a fluid transport device is provided. The fluid transport device comprises a first line connector, a second line connector and an inner line component having a first coupling end and a second coupling end, wherein the first coupling end of the inner line component is configured to be coupled to the first line connector and the second coupling end of the inner line component is configured to be coupled to the second line connector, thereby fluidly connecting the first line connector to the second line connector via the inner line component. The fluid transport device further comprises an outer line component, herein also referred to as shroud or outer sleeve, wherein the outer line component is configured to adopt a mounted state, e.g., an assembled state, in which the outer line component is attached to the first line connector and to the second line connector, such that the outer line component covers, e.g., radially encloses, the first coupling end of the inner line component and the second coupling end of the inner line component. The outer line component is configured to adopt a demounted state, e.g., a disassembled state, in which the outer line component is detached from the first line connector and detached from the second line connector. In the demounted state, the outer line component is movable, for example slidable, relative to the inner line component in order to uncover the first coupling end of the inner line component or the second coupling end of the inner line component.

The fluid transport device may be configured to transport a fluid, i.e., a liquid, a gas or a mixture thereof. In an example, the fluid transport device may transport a fuel, e.g., hydrogen, from a fuel storage such as a tank or fuel cell to a fuel consumer such as an engine, etc. The fluid transport device may be part of a vehicle, for example of an aircraft. In particular, the fluid transport device may be a part of a fuel supply system of an aircraft in which the fuel from the fuel storage or fuel cell is supplied to the engine(s) of the aircraft. The term "line" in the context of the disclosure herein may be understood as a "pipe", a "conduit" or a similar component that is configured to transport the fluid therethrough.

The inventive fluid transport device may enable a facilitated assembly and/or disassembly of a sealed double-walled line system that is suitable to transport or supply hydrogen. In particular, the configuration of the inventive fluid transport device provides a double-walled design which may be prescribed for certain fuel transportation systems. In this double-walled design, the inner line component and the outer line component provide separate walls, wherein the outer line component radially covers or radially encloses the inner line component. In particular, the outer line component radially surrounds the inner line component over the entire length of the inner line component such that the outer line component may be connected to the first line connector and the second line connector, both line connectors being coupled to the respective coupling ends of the inner line component. The first and second line connectors may herein also be referred to as first and second fittings.

An additional seal component may be provided for the connection between the outer line component and the first line connector as well as between the outer line component and the second line connector, such that the inner line component can be sealed with respect to the environment present outside of the outer line component and outside of the first and second line connectors. In other words, the inner line component is a line or pipe section that is sealed off from the environment. Due to the specific arrangement of the individual components, which will be described in more detail herein, a static seal can be used to seal the inner line component including the couplings to the first and second line connectors. Such a static seal has advantages when compared to a dynamic seal. Although dynamic seals can also be used in the context of the disclosure herein, static seals may be preferred.

Concerning leakage rates, a static seal may have advantages over a dynamic seal. This may be due to a compromise that must be made in the seal design to reduce the friction force and the risks of twisting or local surface deformation when the seal experiences movements. Furthermore, the seal wears and its performance degrades over time due to the regular motions. For fuel and fuel vapor, a dynamic seal might be sufficient, but for hydrogen it may be preferred to use a static seal, especially for the high pressure which may be needed for a direct-burn.

Therefore, the inventive fluid transport device allows the introduction of high-performance seals on a double-walled pipe connection used for hydrogen applications. In addition, a reduced leak rate can be achieved because static seals can be used with this specific configuration. Also because of the static nature of the seal, performance degradation over time can be minimized. A further advantage is that a wider choice of sealing types and materials with better performance is available. With the inventive design of the fluid transport device, a secondary sealing component, e.g., a gasket, can also be used to further improve the sealing performance and reliability. The proposed sealing arrangements may allow simpler installation and lower risks of installation damages.

The first line connector may provide a coupling component that fluidly couples the inner line component with a surrounding line system, e.g., the above-mentioned fuel supply system. That is, fluid that passes through the inner line component can be transferred through the first line connector and further into the fuel supply system. Accordingly, the second line connector may also provide a coupling component that fluidly couples the inner line component with a surrounding line system, e.g., the above-mentioned fuel supply system. That is, fluid that is transferred through the first line connector, for example from a fuel supply line, can be further transferred into the inner line component. The first line connector, the second line connector and the inner line component may thus directly transport the fluid. All these three components may have a circular cross-section or a tube-like structure. For example, each of the three components may have the shape of a pipe.

In an example, the inner line component may be a longitudinal pipe or hose that extends from between the first line connector and the second line connector. Similar, the outer line component may be a longitudinal pipe or tube-like structure enclosing the longitudinal inner line component. In the demounted state, the outer line component may thus be slid along a longitudinal direction of the inner line component to uncover either the first coupling end or the second coupling end of the inner line component.

The outer line component may not directly transport the fluid, but rather provides an outer wall or sleeve that radially encloses the inner line component, and preferably also a portion of the first line connector and the second line connector. This configuration provides a double-wall design. By enclosing the inner line component and the first and second coupling ends of the inner line components, the outer line component covers or houses the complete inner line component in the mounted state, such that an operator acting from the outside of the device has no access to the inner line component and the connections between the inner line component to first and second line connectors.

However, in the demounted state, such an access by an operator from the outside of the device may be provided, in particular, when the outer line component is moved or slid along the inner line component to expose, i.e., to uncover, either the first coupling end of the inner line component or the second coupling end of the inner line component.

According to an embodiment, in the demounted state, the outer line component is movable to a first position in which the first coupling end of the inner line component is uncovered while the second coupling end of the inner line component is still covered by the outer line component. Alternatively, in the demounted state, the outer line component is movable to a second position in which the first coupling end of the inner line component is still covered by the outer line component while the second coupling end of the inner line component is uncovered.

For example, when moving the outer line component in a first direction along and/or parallel to the inner line component, the first coupling end of the inner line component will be uncovered, i.e., exposed to the environment, while the second coupling end of the inner line component will be still covered, i.e., enclosed, by the outer line component. In the alternative, when moving the outer line component in a second direction along and/or parallel to the inner line component, the second coupling end of the inner line component will be uncovered, i.e., exposed to the environment, while the first coupling end of the inner line component will still be covered, i.e., enclosed, by the outer line component. The first direction may be opposite to the second direction. In the uncovered or exposed state, the respective coupling end may be freely accessible from the outside, for example by an operator, for assembling, disassembling or servicing the coupling between the respective coupling end of the inner line component and the associated line connector that is coupled to the respective coupling end.

According to an embodiment, at least a first portion of the outer line component has an inner diameter that is greater than an outer diameter of the first line connector, such that, in the demounted state, the first portion of the outer line component is movable outside of and along the first line connector.

For mounting the outer line component to the first line connector, the outer line component may be slid over a small mounting portion of the first line connector. Therefore, the inner diameter of the first portion of the outer line component may be greater than this small mounting portion of the first line connector in order to enable sliding of at least the first portion of the outer line component over the small mounting portion of the first line connector before connecting the outer line component to the first line connector. In this manner, an overlap in the mounted state can be provided between an inner surface of the outer line component and an outer surface of the first line connector, thereby enabling the placement of one or more seal components, as will be described in more detail below.

According to an embodiment, in the mounted state, the outer line component encloses the inner line component at least over the entire length of the inner line component.

In this manner, the inner line component can be completely enclosed and covered by the outer line component. By sealingly engaging the outer line component with the first and second line connectors, the inner line component can be hermetically sealed off from the environment.

According to an embodiment, in the mounted state, the outer line component is radially spaced apart from the inner line component.

This means that there may be a space between an outer surface of the inner line component and an inner surface of the outer line component. The space may be chosen such that during movement of the outer line component relative to the inner line component, a contact between both components can be avoided. As indicated above, the inner line component may be a hose that has a certain flexibility and, thus, may slightly move inside the outer line component.

According to an embodiment, in the mounted state, the outer line component is attached to the first line connector via a first flange component and attached to the second line connector via a second flange component.

The attachment between the outer line component and the first flange component may be provided by a bolted or screwed joint. The attachment between the first flange component and the first line connector may also be provided by a bolted or screwed joint. There may not be any direct joints between the outer line component and the first line connector. However, a primary sealing component may be arranged between the outer line component and the first line connector.

Analogously, the attachment between the outer line component and the second flange component may be provided by a bolted or screwed joint. The attachment between the second flange component and the second line connector may also be provided by a bolted or screwed joint. There may not be any direct joints between the outer line component and the second line connector. However, another primary sealing component may be arranged between the outer line component and the second line connector.

According to an embodiment, the first flange component is radially attached to the first line connector and axially attached to the outer line component. Additionally or alternatively, the second flange component is axially attached to the second line connector and axially attached to the outer line component.

For example, the first flange may be provided in the form of an L-flange, where the first flange leg is radially attached via a bolted or screwed joint to the outer surface of the first line connector and the second flange leg is axially attached via a bolted or screwed joint to a corresponding flange element of the outer line component.

For example, the second flange may be provided in the form of an H-flange, where the first flange leg is axially attached via a bolted or screwed joint to a corresponding flange element of the second line connector and the second flange leg is axially attached via a bolted or screwed joint a further corresponding flange element of the outer line component.

According to an embodiment, the first flange component comprises two flange elements, each of the two flange elements having a half-ring shape, wherein the two flange elements of the first flange component together form a full-ring shape when the first flange component is attached to the first line connector. Alternatively or additionally, the second flange component comprises two flange elements, each of the two flange elements having a half-ring shape, wherein the two flange elements of the second flange component together form a full-ring shape when the second flange component is attached to the second line connector. The two flange elements of the first and second flange components may herein also be referred to as half shells.

For example, in the mounted state of the outer line component, the two flange elements, i.e., the half shells, of the first flange component are attached to the first line connector. In this mounted state, the first flange component shows the full-ring shape, thereby completely encircling the first line connector. It may be possible, that the flange component can be split into the two flange elements, each having a half-ring shape, only when the first flange component is detached from the first line connector.

Each two flange elements of half-ring shape may have two connecting regions with respective overlapping features. An overlapping feature of one flange element may be in the form of a recess that engages a corresponding overlapping feature of the counterpart flange element. This will be described in more detail with regard to the description of the figures below. The above explanations with regard to the first flange component and its connecting features may analogously apply for the second flange component.

According to an embodiment, the fluid transport device further comprises a primary seal component arranged between the outer line component and the first line connector when the outer line component is in the mounted state.

The primary seal component may comprise a seal that is located within a closed groove underneath the outer line component, i.e., underneath the sliding sleeve. Several possibilities for the seal geometry, for example O-ring, square ring, X-ring etc., can be used and Fluorosilicone, Butyl etc. can be used as material for the seal. The primary seal component is arranged between the outer line component and the first line connector, thereby sealing off the inner line component as well as the space between the inner line component and outer line component from the environment.

According to an embodiment, primary seal component comprises a static seal.

A static seal may be a seal that seals components with respect to each other, which after the assembly or mounting process do not move relative to each other. However, as indicated above, a dynamic seal can also be used.

According to an embodiment, the fluid transport device further comprises a secondary seal component arranged within a receptacle that is at least partially defined by an axial surface of the outer line component and an outer surface of the first line connector when the outer line component is in the mounted state.

In an example, the receptacle is defined by the axial surface of the outer line component, the outer surface of the first line connector and the first flange component. The secondary seal component may have an L-shape. Accordingly, the receptacle may have an L-shape to accommodate the secondary seal component. The secondary seal component may comprise a seal in the form of a gasket underneath the two flange elements, i.e., the two half shells, of the first flange component to improve the sealing performance and reliability. This gasket can be manufactured as either two halves or as one piece with a cut to allow an installation around the first and second line connectors, i.e., around the fittings. There may be overlapping features provided on the gasket to minimize leakage at the segment interface or through the cut. The gasket can be made of elastomer or PTFE.

According to an embodiment, the fluid transport device further comprises an inner seal component configured to seal a coupling between the first coupling end of the inner line component and the first line connector.

The inner seal component therefore prevents leakage of the fluid that passes the coupling between the inner line component and the first line connector such that no fluid can leak into the space between the inner line component and the outer line component. Analogously, another inner seal component may be provided to seal a coupling between the second coupling end of the inner line component and the second line connector.

According to an aspect, the fluid transport device as described herein is used for transporting hydrogen.

According to another aspect, an aircraft is provided that comprises the fluid transport as described herein.

According to another aspect, a method for assembling and disassembling a fluid transport device is provided. In a step of the method, a first line connector is arranged spatially separated from a second line connector. In another step, an inner line component is arranged between the first line connector and the second line connector. In another step, a first coupling end of the inner line component is coupled to the first line connector and a second coupling end of the inner line component is coupled to the second line connector, thereby fluidly connecting the first line connector to the second line connector via the inner line component. In another step, an outer line component is mounted to the first line connector and to the second line connector, such that the outer line component covers the first coupling end of the inner line component and the second coupling end of the inner line component. In another step, the outer line component is demounted from the first line connector and from the second line connector. In another step, the outer line component is moved relative to the inner line component in order to uncover the first coupling end of the inner line component or the second coupling end of the inner line component.

The above-mentioned steps of the method may be performed in the indicated order.

The inventive fluid transport device as described above and below is designed with a sliding sleeve, i.e., the outer line component, to allow the installation of the inner coupling(s) via bolted flange components. An additional mechanism is integrated to fix the sliding sleeve after the installation, and this allows the use of high performance static seals on the inner and outer line components. Furthermore, the inventive fluid transport device provides several sealing concepts that can be used in combination with the coupling design.

BRIEF DESCRIPTION OF THE DRAWINGS

The disclosure herein will hereinafter be described in conjunction with the following drawing figures, wherein like numerals denote like elements, and wherein.

DETAILED DESCRIPTION

Figure 1:
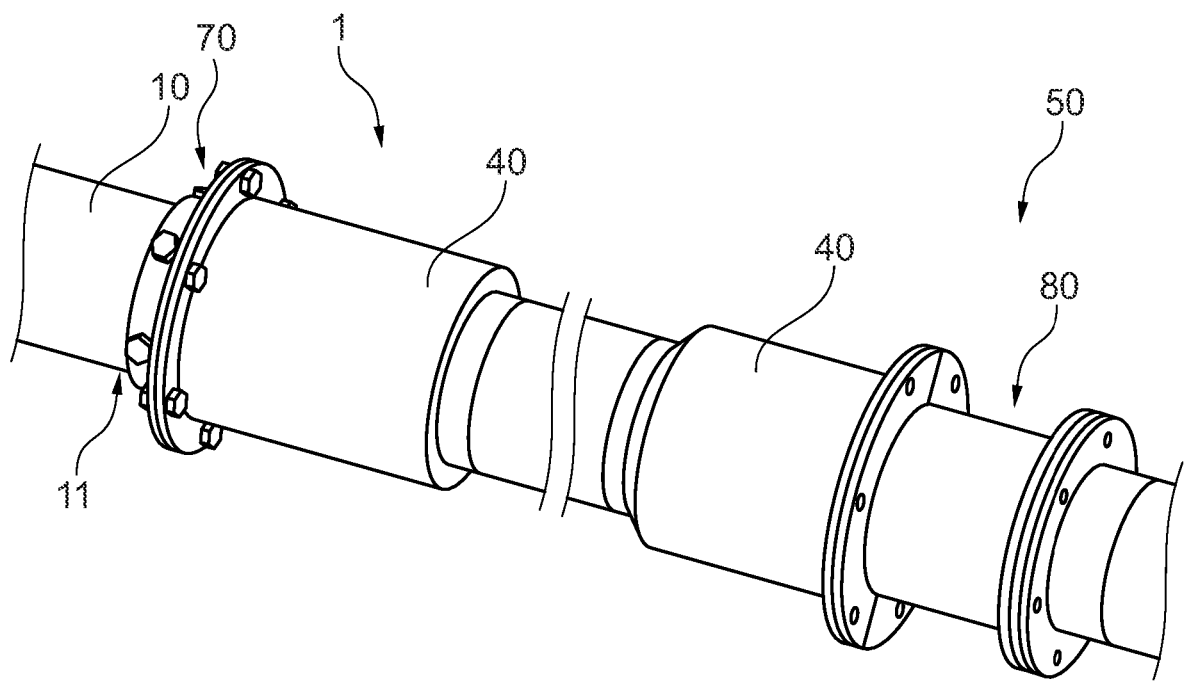
FIG. 1 shows a fluid transport device in an assembled state.

The representations and illustrations in the drawings are schematic and not to scale. A better understanding of the method and system described above may be obtained through a review of the illustrations accompanying this application together with a review of the detailed description that follows.

FIG. 1 shows a fluid transport device 1 in an assembled state, i.e., in a mounted state, where an outer line component 40 is mounted to a first line connector 10 via a flange component 70 as well as to a second line connector (not visible in FIG. 1) via a second flange component 80. An inner line component, which in the mounted state is completely covered by the outer line component 40 and therefore not visible in FIG. 1 has a first coupling end and a second coupling end, wherein the first coupling end couples the (covered) inner line component to the first line connector 10 and the second coupling end couples the inner line component (covered) to the second line connector. In the illustrated example, a cut is drawn through the outer line component 40 indicating that the outer line component can have any length.

The outer line component 40 is configured to adopt the mounted state 50 as shown in FIG. 1 in which the outer line component 40 is attached to the first line connector 10 and to the second line connector, such that the outer line component covers the first coupling end and the second coupling end of the inner line component.

Figure 2:
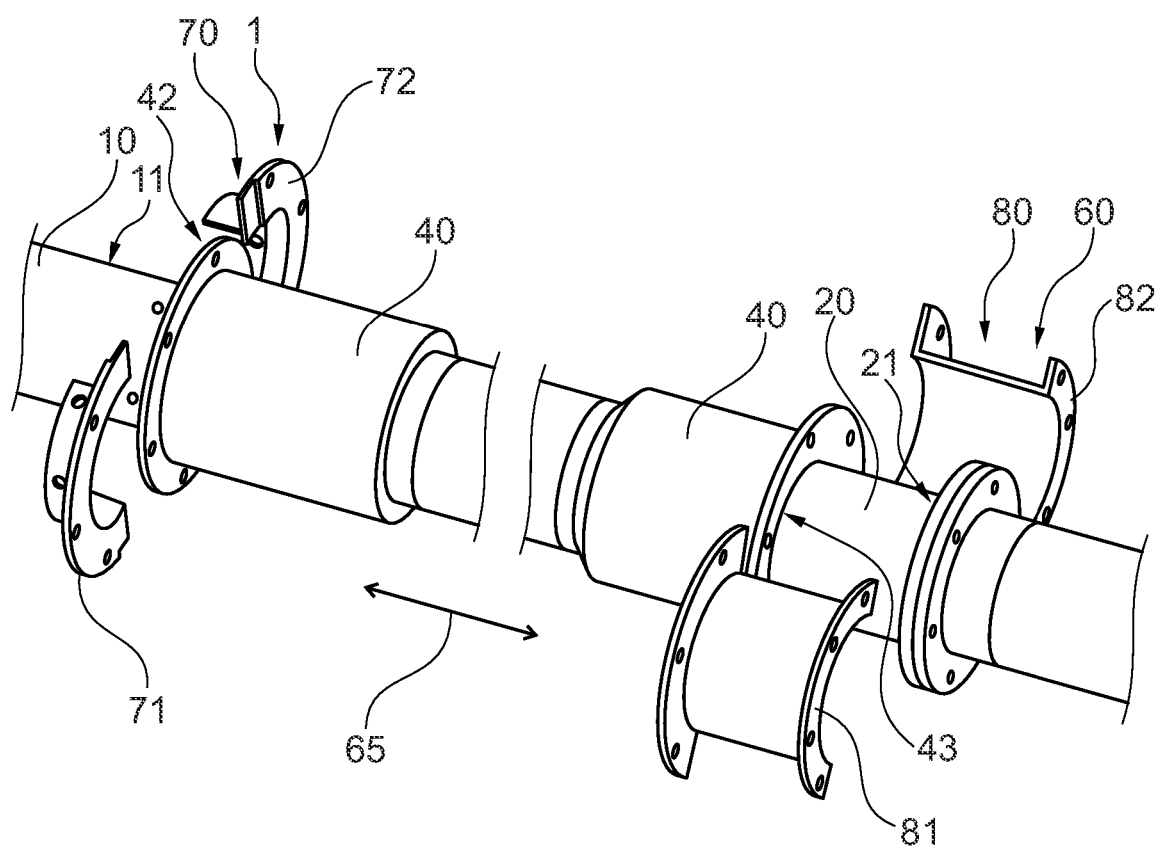
FIG. 2 shows the fluid transport device of FIG. 1 in a partially disassembled state.

The outer line component 40 is further configured to adopt a demounted state 60 as shown in FIG. 2 in which the outer line component 40 is detached from the first line connector 10 and also detached from the second line connector 20. In this demounted state 60, the outer line component 40 is movable relative to the inner line component in order to uncover the first coupling end of the inner line component or the second coupling end of the inner line component. The inner line component and one of its coupling ends will be discussed in more detail with respect to FIG. 5 below.

As can be seen from FIGS. 1 and 2, the outer line component 40 as well as the first line connector 10 and the second line connector 20 appear in the form of pipe segments, pipe-like structures or tube-like structures. The first line connector 10 and the second line connector 20 may be fluidly coupled via the inner line component such that fluid can flow through these components. The outer line component 40, however, may not be in contact with any of the passing fluid. The outer line component 40 may rather be a shroud or sliding sleeve that can be moved or slid relative to the inner line component as well as the first line connector 10 and the second line connector 20, when the outer line component 40 is in the demounted state 60 as shown in FIG. 2.

As can be derived from FIG. 2, the outer line component 40, i.e., the sliding sleeve 40 or outer tube 40, can now be slid to the left or right side as indicated by arrow 65 in order to allow access to the connection areas of the inner line component.

Figure 3:
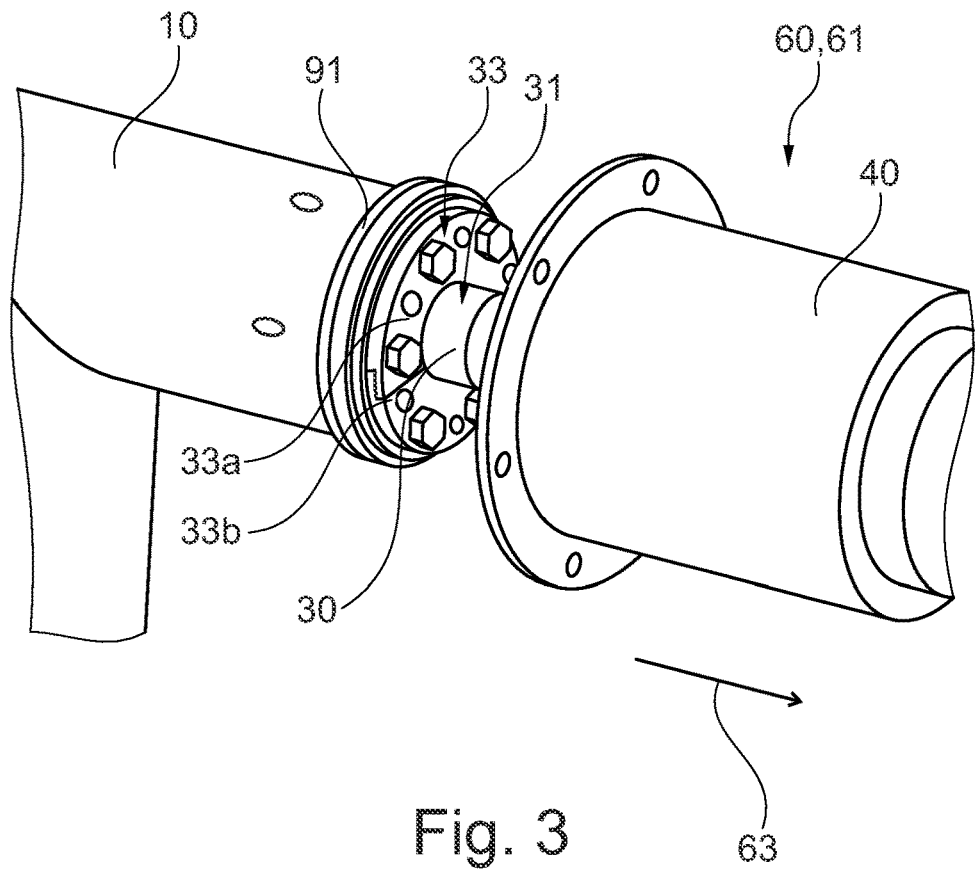
FIG. 3 shows the fluid transport device of FIG. 1 with a first coupling end being uncovered.

For example, FIG. 3 shows a sectional view of the fluid transport device 1 where the outer line component 40 is in the demounted state 60. The outer line component 40 has been moved in a first direction 63 relative to the first line connector 10 and relative to the inner line component 30. In this configuration, the outer line component 40 was moved to a first position 61 in which the first coupling end 31 of the inner line component 30 is uncovered and thus accessible to an operator from the outside.

Figure 4:
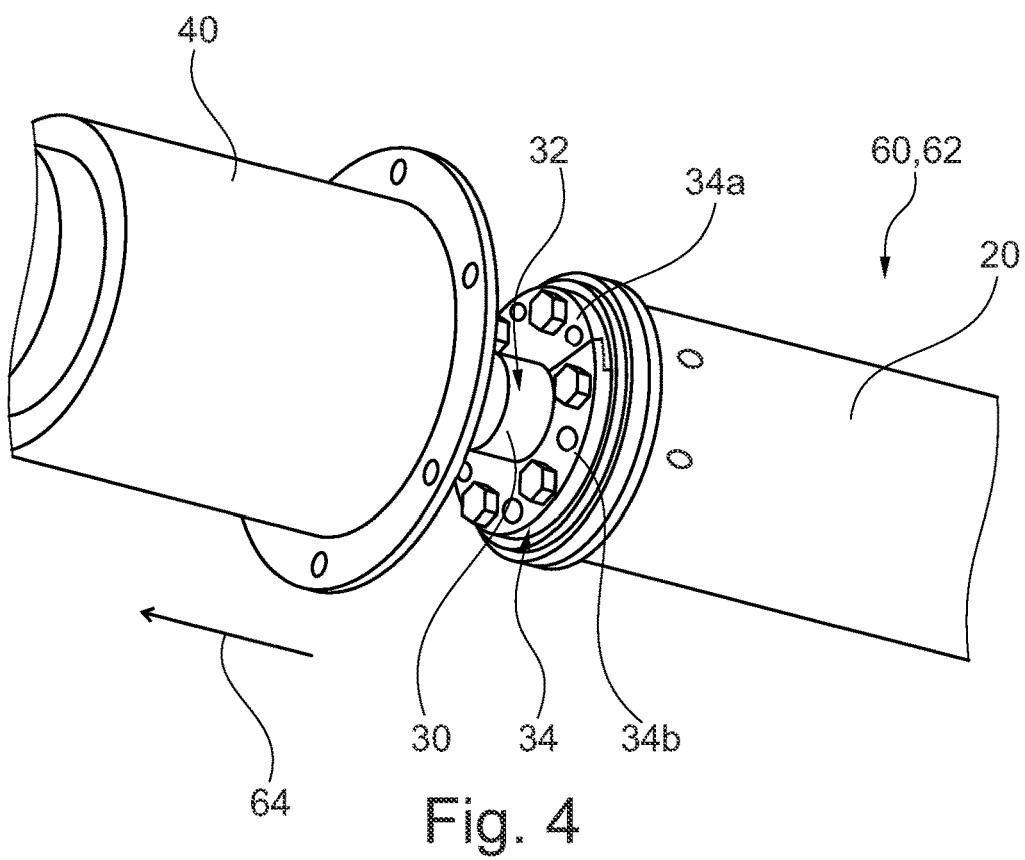
FIG. 4 shows the fluid transport device of FIG. 1 with a second coupling end being uncovered.

FIG. 4 also shows a sectional view of the fluid transport device 1 where the outer line component 40 is in the demounted state 60. The outer line component 40 has been moved in a second direction 64 relative to the second line connector 20 and relative to the inner line component 30. In this configuration, the outer line component 40 was moved to a second position 62 in which the second coupling end 32 of the inner line component 30 is uncovered and thus accessible to an operator from the outside.

Although not shown in FIGS. 3 and 4, it is possible that, in the first position 61, the second coupling end 32 is covered by the outer line component 40, and that, in the second position 62, the first coupling end 31 is covered by the outer line component 40.

FIG. 3 further shows a coupling unit 33 that couples the first coupling end 31 of the inner line component 30 to the first line connector 10. The coupling unit 33 comprises a first coupling element 33a and a second coupling element 33b, each of which has overlapping features, for example recesses. For example, the recesses of the first coupling element 33a are configured to engage corresponding recesses of the second coupling element 33b. FIG. 3 shows a configuration in which the coupling unit 33 attaches the first coupling end 31, for example via screws and/or bolts, to the first line connector 10. The coupling elements 33a, 33b may have a half-ring shape and together provide a full-ring shape. When mounted, the coupling unit 33 may comprise a disk-like or plate-like structure.

FIG. 4 shows a further coupling unit 34 that couples the second coupling end 32 of the inner line component 30 to the second line connector 20. The further coupling unit 34 comprises a first coupling element 34a and a second coupling element 34b, each of which has overlapping features, for example recesses. For example, the recesses of the first coupling element 34a are configured to engage corresponding recesses of the second coupling element 34b. FIG. 4 shows a configuration in which the further coupling unit 34 attaches the first coupling end 31, for example via screws and/or bolts, to the second line connector 20. The coupling elements 34a, 34b may have a half-ring shape and together provide a full-ring shape. When mounted, the further coupling unit 34 may comprise a disk-like or plate-like structure.

The coupling unit 33 of FIG. 3 can act as an inner pipe connection by which the inner line component 30, e.g., hose, is held in place via the split bolted flanges 33a, 33b with overlapping features. A face seal can be used in between the inner line component 30 and the first line connector 10 to prevent leakage from the inner fluid pipe which is constructed of the inner line component 30 and the first line connector 10.

FIG. 3 further shows a primary seal component 91 which will be described in more detail with reference to FIG. 5.

As shown in FIGS. 1 and 2, the outer line component 40 is attached to the first line connector 10 via the first flange component 70 and attached to the second line connector 20 via the second flange component 80. The first flange component 70 is radially attached to an outer surface 11 of the first line connector 10 and axially attached to a first axial surface 42 of the outer line component 40. The second flange component 80, in contrast, is axially attached to an axial surface 21 of the second line connector 20 and axially attached to a second axial surface 43 of the outer line component 40.

As can be seen in FIG. 2, the first flange component 70 comprises two flange elements 71, 72, each of the two flange elements 71, 72 having a half-ring shape with an L-shaped cross-section. The two flange elements 71, 72 of the first flange component 70 together form a full-ring shape when the first flange component 70 is attached to the first line connector 10 as shown in FIG. 1.

As can also be seen in FIG. 2, the second flange component 80 comprises two flange elements 81, 82, each of the two flange elements 81, 82 having a half-ring shape with an H-shaped cross-section. The two flange elements 81, 82 of the second flange component 80 together form a full-ring shape when the second flange component 80 is attached to the second line connector 20 as shown in FIG. 1.

The half-shells 71, 72 of the first flange component 70 and the half-shells 81, 82 of the second flange component 80 can be designed with overlapping features, for example corresponding recesses, for better alignment during the installation.

This above-described fluid transport device 1 allows to combine a double-walled coupling design with high performance seals for high pressure hydrogen applications. The outer line component 40, herein also referred to as sliding sleeve 40 or outer tube 40, is fixed in place by respective half-shells of the flange components 70, 80 so that it cannot move during operation of a vehicle in which the fluid transport device 1 is installed. Static seals can be used underneath the sliding sleeve 40. In this design, the half-shells are bolted onto the sliding sleeve 40 on one side and on the first and second line connectors 10, 20 on the other side. The shell bolted joint can be provided by using either an axial flange component as described for the second line connector 20 in FIGS. 1 and 2 or by attaching the flange component radially around the circumference of the line connector as described for the first line connector 10 in FIGS. 1 and 2. The radial configuration allows the shell to be more axially compact.

Figure 5:
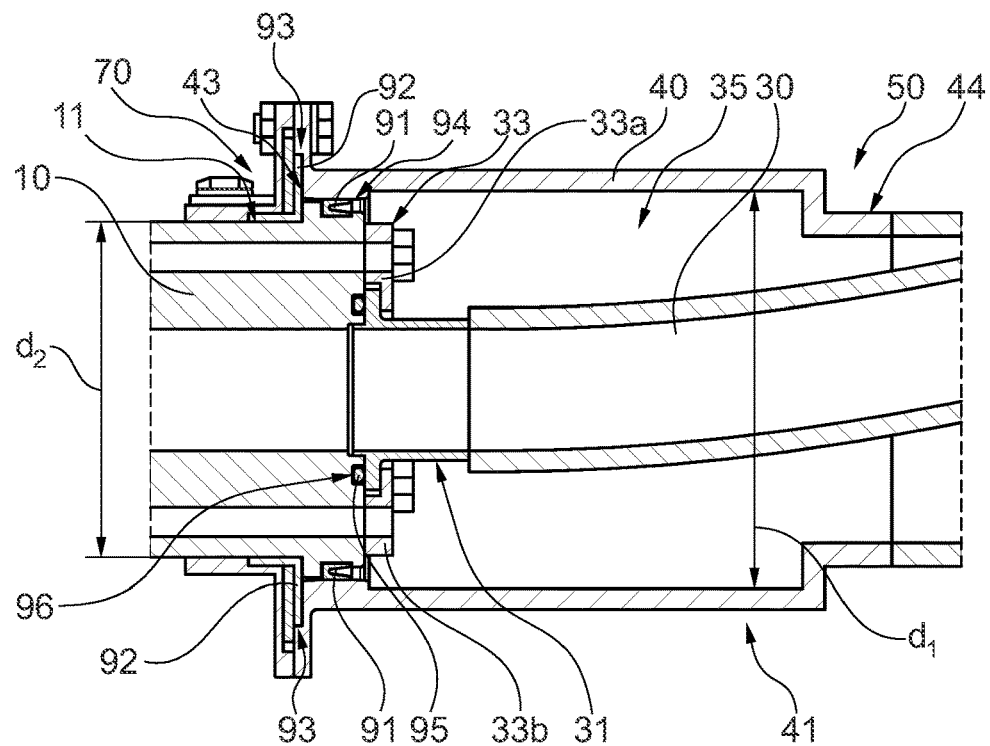
FIG. 5 shows a cross-sectional view of a portion of the fluid transport device of FIG. 1.

FIG. 5 shows a cross-sectional view of a portion of the fluid transport device 1 of FIG. 1. This Figure shows the first line connector 10 which is fluidly connected to the first coupling end 31 of the inner line component 30 by the coupling unit 33, which coupling unit comprises the two coupling elements 33a and 33b. A part of the first coupling end 31 may be pressed against a face surface of the first line connector 10 by the coupling unit 33 which itself is attached to the first line connector 10 via bolts or screws.

An inner seal component 95 is provided at the contact region between the first coupling end 31 and the first line connector 10. The inner seal component 95 is thus configured to seal the coupling between the first coupling end 31 of the inner line component 30 and the first line connector 10. A recess 96 is provided for accommodating the inner seal component 95.

Furthermore, a primary seal component 91 can be arranged between the outer line component 40 and the first line connector 10 when the outer line component 40 is in the mounted state 50 as shown in FIG. 5. This primary seal component 91 may be a static seal. The primary seal component 91 may be arranged within a recess 94 that is provided for at least partially accommodating the primary seal component 91. The recess 94 and the primary seal component 91 may extend around the circumference of the first line connector 10 and may be arranged such that the primary seal component 91 seals off a space 35 between the inner line component 30 and the outer line component 40. In particular, the primary seal component 91 is arranged between an outer surface of the first line connector 10 and an inner surface of the outer line component 40 to seal off the space 35 with respect to the environment outside of the outer line component 40. In an alternative example, which is not shown in the figures, the recess 94 and the primary seal component 91 may extend around an inner circumference of the outer line component 40 and may be arranged such that the primary seal component 91 seals off the space 35 between the inner line component 30 and the outer line component 40.

Figure 8:
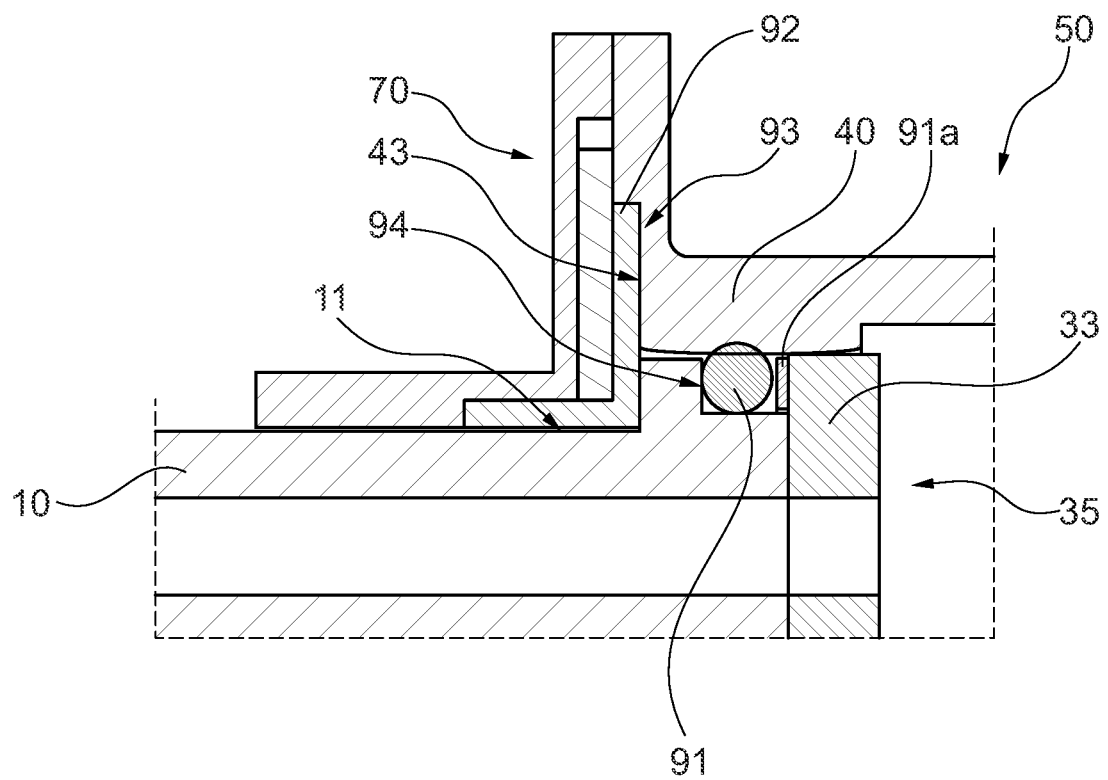
FIG. 8 shows an arrangement of a primary seal component and a secondary seal component in the fluid transport device of FIG. 1.
Figure 9:
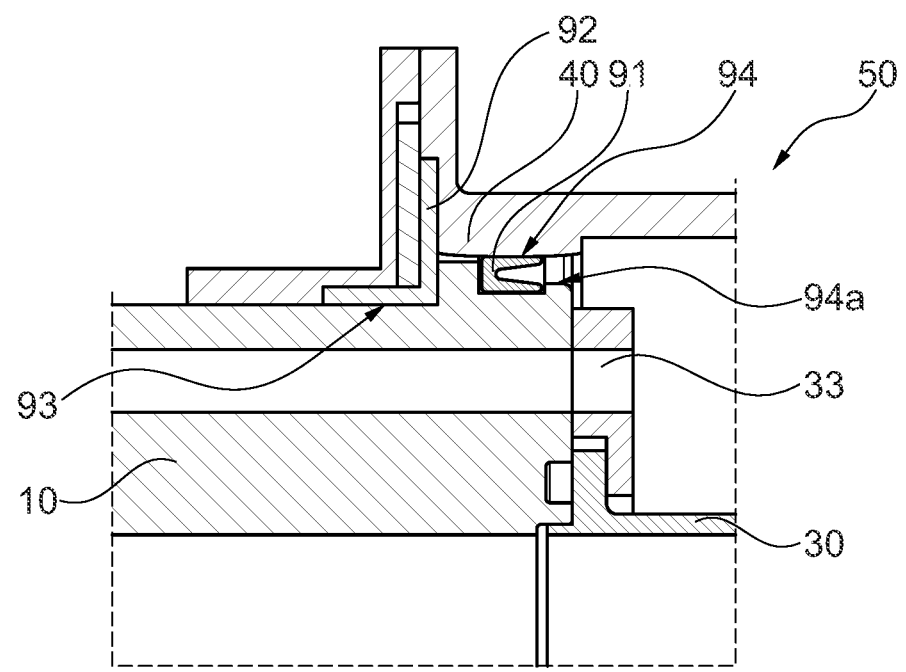
FIG. 9 shows an alternative design for a primary seal component in the fluid transport device of FIG. 1.

Furthermore, as can also be derived from FIG. 5 in connection with FIGS. 8 and 9, a secondary seal component 92 can be arranged within a receptacle 93 that is at least partially defined by the axial surface 43 of the outer line component 40 and the outer surface 11 of the first line connector 10 when the outer line component 40 is in the mounted state 50. The receptacle 93 for accommodating the secondary seal component 92 can be further defined and closed by attaching the first flange component 70 to the outer surface 11 of the first line connector 10 and the axial surface 43 of the outer line component 40.

As can be derived from FIG. 5. at least a first portion 41 of the outer line component 40 has an inner diameter $d_1$ that is greater than an outer diameter $d_2$ of the first line connector 10, such that, in the demounted state 60, the first portion 41 of the outer line component 40 is movable outside of and along the first line connector 10, i.e., the outer line component 40 can be slid over the first line connector 10. A step 44 can be present at the outer line component 40, wherein the step 44 decreases the inner diameter $d_1$, thereby reducing the radial space between the inner line component 30 and the outer line component 40.

Figure 6:
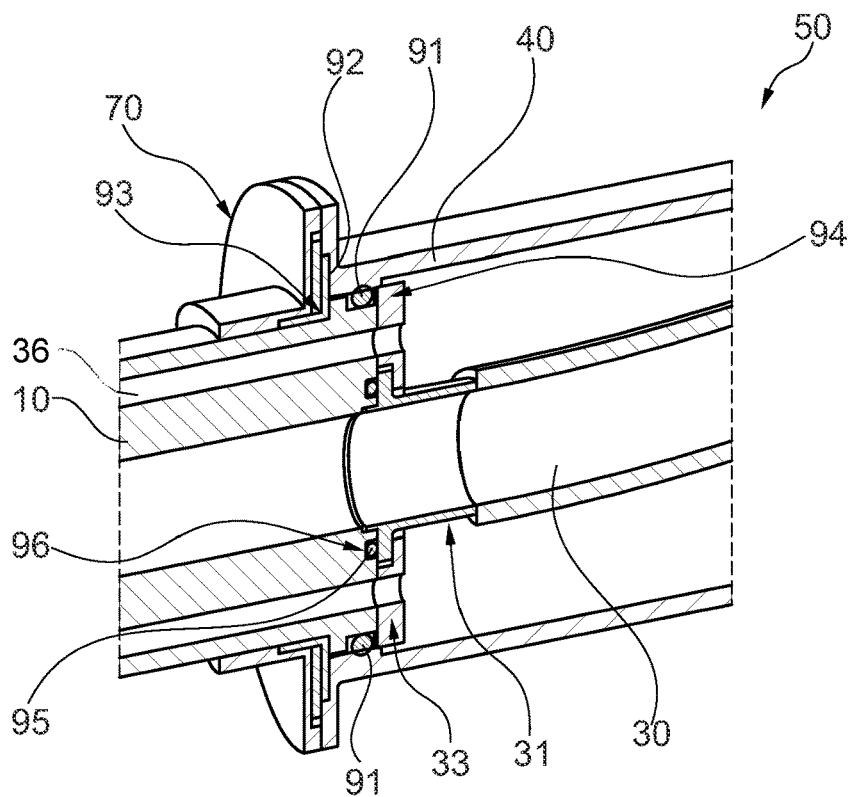
FIG. 6 shows a perspective cross-sectional view of a portion of the fluid transport device of FIG. 1.

FIG. 6 shows a perspective cross-sectional view of the portion of the fluid transport device 1 as illustrated in FIG. 5. FIG. 6 therefore shows another perspective of most of the components already discussed in view of FIG. 5, to which it is referred. FIG. 6 also shows a bore 36 that extends through the first line connector 10 and through the coupling unit 33. This bore 36 may provide an interconnection between different shroud sections in which separate outer line components 40 as explained herein are located. In an example, several bores 36 that extend through the first line connector 10 and through the coupling unit 33 can be provided. Two of them can be seen in FIG. 6.

Figure 7A:
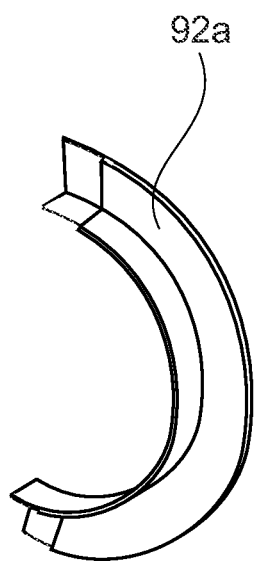
FIG. 7A shows a first half of a gasket seal.
Figure 7B:
FIG. 7B shows a second half of a gasket seal.
Figure 7C:
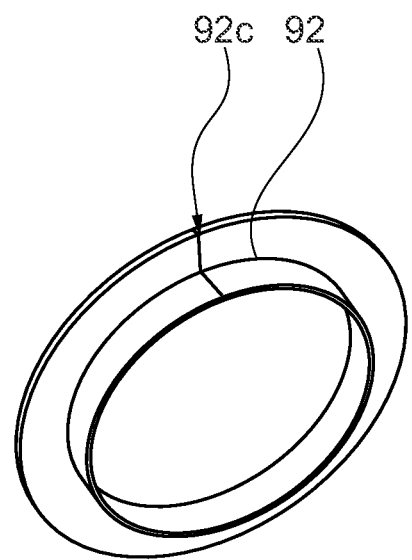
FIG. 7C shows a complete gasket seal.

FIGS. 7A, 7B and 7C illustrate a gasket seal which may be used as the secondary seal component 92 described herein. In particular, FIG. 7A shows a first half 92a of the gasket seal 92, FIG. 7B shows a second half 92b of the gasket seal 92b and FIG. 7C shows the complete gasket seal 92 formed by the first and second halves 92a, 92b of the gasket seal 92. These figures illustrate that the gasket seal 92 can be manufactured as either two halves or as one piece with a cut 92c (see FIG. 7C) to allow the installation around the first and second line connectors 10, 20. There are overlapping features, e.g., corresponding recesses, on the gasket seal 92 to minimize any potential leakage at the segment interface or through the cut 92c. The gasket seal 92 can be made out of elastomer or PTFE.

FIGS. 8 and 9 show enlarged views of an arrangement of the primary seal component 91 and the secondary seal component 92 in the fluid transport device 1. Due to its shape, the primary seal component 91 would require seal stretching during the installation which might lead to the risk of installation damages and might also limit the application to stretchable seals. FIGS. 8 and 9 now show two alternative groove designs, i.e., alternative designs for the receptacles 93 and 94.

In FIG. 8, the receptacle 94 is open to space 35 and the outer diameter of the coupling unit 33 is enlarged to close the receptacle 94 after the primary seal component 91 is installed. A backup ring 91a may be provided between the primary seal component 91 and the coupling unit 33 in this configuration to prevent seal extrusion into the gaps between the first line connector 10 and the coupling unit 33.

In FIG. 9, the receptacle 94 is open with a small step 94a on the right end (at the exit) of the receptacle 94 to keep the primary seal component 91 in place. This configuration still requires stretching of the primary seal component 91 during the installation but the amount of stretch is much less and there is no need to use the coupling unit 33 as part of the receptacle 94. Both configurations of FIGS. 8 and 9 allow for an easier installation and for the consideration of using seals that are less stretchable such as PTFE spring-energized seals or metal seals.

It is noted that different types of seals for the primary seal component 91 and the secondary seal component 92 can be used. This includes but is not limited to an elastomer seal (e.g., O-ring, D-ring, square ring, X-ring), PTFE (or other polymer) spring energized seals, metal seals (O-ring, C-ring, spring-energized) and metal or polymer gaskets.

Figure 10:
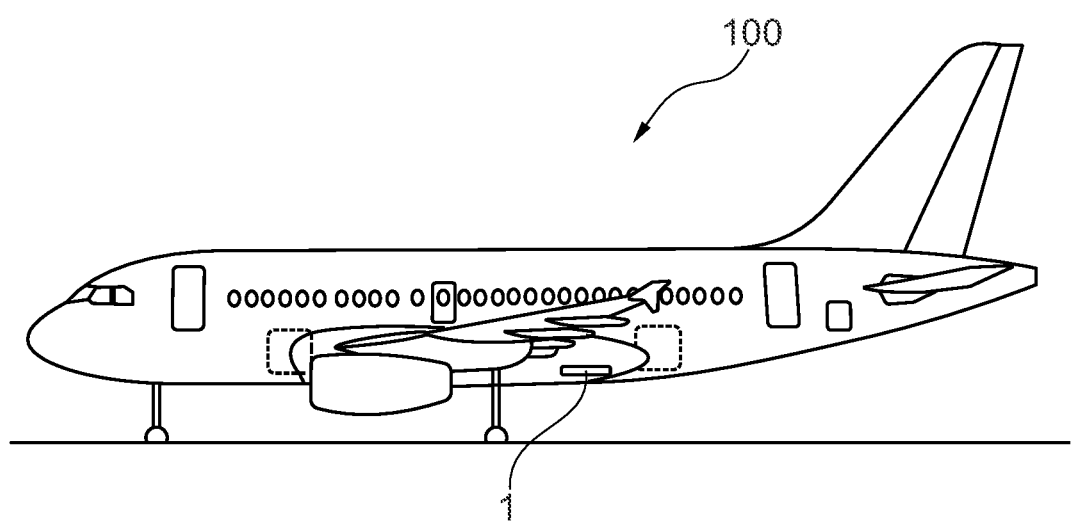
FIG. 10 shows an aircraft comprising the fluid transport device of FIG. 1.

FIG. 10 shows an aircraft 100 comprising the fluid transport device 1 of FIG. 1. The aircraft 100 may be a transport or passenger aircraft. It will be appreciated however that the fluid transport device 1 of FIG. 1 may be integrated into any kind of vehicle or even into a stationary platform.

Figure 11:
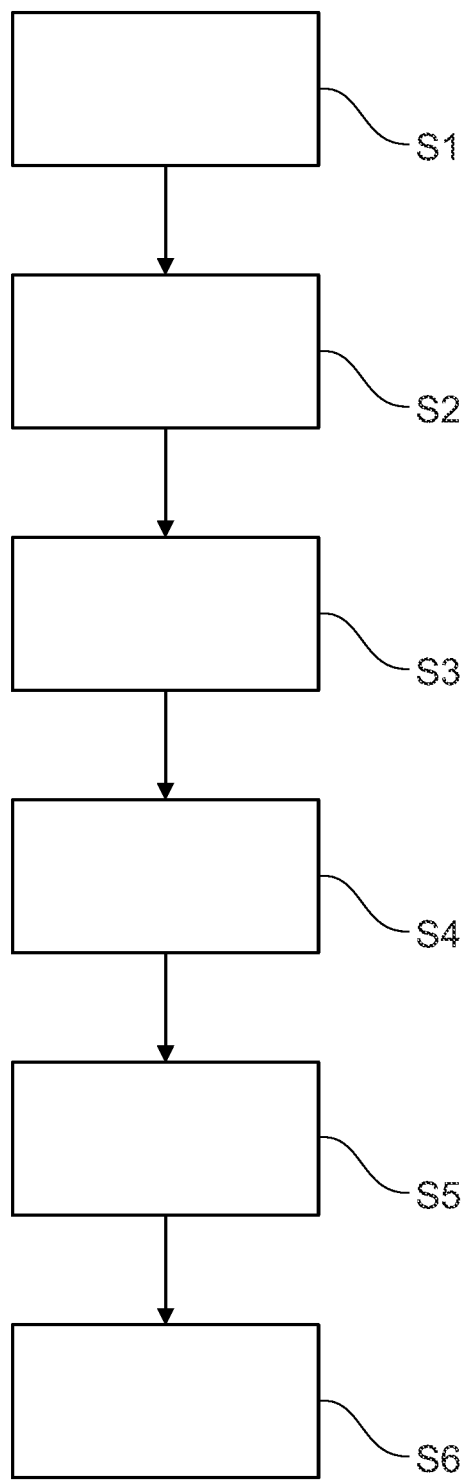
FIG. 11 shows a flow diagram of a method for assembling and disassembling a fluid transport device.

FIG. 11 shows a flow diagram of a method for assembling and disassembling a fluid transport device 1, for example the fluid transport device 1 of FIG. 1 as described above. A step S1 of the method comprises arranging a first line connector 10 spatially separated from a second line connector 20. A step S2 comprises arranging an inner line component 30 between the first line connector 10 and the second line connector 20. A step S3 comprises coupling a first coupling end 31 of the inner line component 30 to the first line connector 10 and a second coupling end 32 of the inner line component 30 to the second line connector 20, thereby fluidly connecting the first line connector 10 to the second line connector 20 via the inner line component 30. A step S4 comprises mounting an outer line component 40 to the first line connector 10 and to the second line connector 20, such that the outer line component 40 covers the first coupling end 31 of the inner line component 30 and the second coupling end 32 of the inner line component 30. A step S5 comprises demounting the outer line component 40 from the first line connector 10 and from the second line connector 20. A step S6 comprises moving the outer line component 40 relative to the inner line component 30 in order to uncover the first coupling end 31 of the inner line component 30 or the second coupling end 32 of the inner line component 30.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fluid transport device, comprising:
a first line connector;
a second line connector;
an inner line component comprising:
a first coupling end configured for coupling to the first line connector; and
a second coupling end configured for coupling to the second line connector, such that the first line connector is fluidically connected to the second line connector via the inner line component;
an outer line component configured to adopt:
a mounted state, in which the outer line component is attached to the first line connector and to the second line connector, such that the outer line component covers both the first coupling end of the inner line component and the second coupling end of the inner line component; and
a demounted state, in which the outer line component is detached from both the first line connector and the second line connector;

wherein, in the demounted state:
  the outer line component is movable, relative to the inner line component, to a first position, in which the first coupling end of the inner line component is not covered by the outer line component and the second coupling end of the inner line component is covered by the outer line component; and
  the outer line component is movable, relative to the inner line component, to a second position, in which the first coupling end of the inner line component is covered by the outer line component and the second coupling end of the inner line component is not covered by the outer line component.

2. The fluid transport device according to claim 1, wherein at least a first portion of the outer line component has an inner diameter that is greater than an outer diameter of the first line connector, such that, in the demounted state, the first portion of the outer line component is movable outside of and along the first line connector.

3. The fluid transport device according to claim 1, wherein, in the mounted state, the outer line component encloses the inner line component at least over an entire length of the inner line component.

4. The fluid transport device according to claim 1, wherein, in the mounted state, the outer line component is radially spaced apart from the inner line component.

5. The fluid transport device according to claim 1, wherein, in the mounted state, the outer line component is attached to the first line connector via a first flange component and attached to the second line connector via a second flange component.

6. The fluid transport device according to claim 5, wherein:
  the first flange component is radially attached to the first line connector and axially attached to the outer line component; and/or
  the second flange component is axially attached to the second line connector and axially attached to the outer line component.

7. The fluid transport device according to claim 5, wherein:
  the first flange component comprises two flange elements, each of the two flange elements having a half-ring shape, wherein the two flange elements of the first flange component together form a full-ring shape when the first flange component is attached to the first line connector; and/or
  the second flange component comprises two flange elements, each of the two flange elements having a half-ring shape, wherein the two flange elements of the second flange component together form a full-ring shape when the second flange component is attached to the second line connector.

8. The fluid transport device according to claim 7, wherein each of the two flange elements of the second flange component have an H-shaped cross-section.

9. The fluid transport device according to claim 8, wherein, in the mounted state, the outer line component is connected to the second line connector by the second flange component in such a manner that an end of the outer line component that is closest to the second line connector is axially spaced apart from the second line connector by the second flange component.

10. The fluid transport device according to claim 9, wherein, in the mounted state, an entirety of a distance defined between adjacent respective ends of the first and second line connectors is occupied by only the second flange component and the outer line component.

11. The fluid transport device according to claim 10, wherein:
  the outer line component comprises:
    at a first end thereof, a first section with a first diameter;
    at a second end thereof, which is an opposite end of the outer line component from the first end, a second section with a second diameter; and
    between the first and second ends, a middle section with a third diameter; and
  the first diameter and the second diameter are greater than the third diameter.

12. The fluid transport device according to claim 11, wherein the first section, the second section, and the middle section define an entire length of the outer line component.

13. The fluid transport device according to claim 12, wherein the middle section extends continuously from the first section to the second section.

14. The fluid transport device according to claim 1, comprising
  a primary seal component between the outer line component and the first line connector when the outer line component is in the mounted state.

15. The fluid transport device according to claim 14, wherein the primary seal component comprises a static seal.

16. The fluid transport device according to claim 1, comprising
  a secondary seal component within a receptacle that is at least partially defined by an axial surface of the outer line component and an outer surface of the first line connector when the outer line component is in the mounted state.

17. The fluid transport device according to claim 1, comprising
  an inner seal component configured to seal a coupling between the first coupling end of the inner line component and the first line connector.

18. A method of transporting hydrogen, the method comprising:
  using the fluid transport device according to claim 1 for transporting the hydrogen.

19. An aircraft comprising the fluid transport device according to claim 1.

20. A method for assembling and disassembling a fluid transport device, the method comprising:
  arranging a first line connector spatially separated from a second line connector;
  arranging an inner line component between the first line connector and the second line connector;
  coupling a first coupling end of the inner line component to the first line connector and a second coupling end of the inner line component to the second line connector, thereby fluidically connecting the first line connector to the second line connector via the inner line component;
  mounting an outer line component to the first line connector and to the second line connector, such that the outer line component covers the first coupling end of the inner line component and the second coupling end of the inner line component; and
  demounting the outer line component from the first line connector and from the second line connector;
  wherein, when the outer line component is demounted from the first line connector and from the second line connector:
    the outer line component is movable, relative to the inner line component, to a first position, in which the first coupling end of the inner line component is not covered by the outer line component and the second coupling end of the inner line component is covered by the outer line component; and the outer line component is movable, relative to the inner line component, to a second position, in which the first coupling end of the inner line component is covered by the outer line component and the second coupling end of the inner line component is not covered by the outer line component.

* * * * *